(12) United States Patent
Oaki et al.

(10) Patent No.: US 7,765,023 B2
(45) Date of Patent: Jul. 27, 2010

(54) ROBOT CONTROLLER AND ROBOT CONTROLLING METHOD

(75) Inventors: Junji Oaki, Kanagawa-Ken (JP);
Hideaki Hashimoto, Kanagawa-Ken (JP); Fumio Ozaki, Kanagawa-Ken (JP);
Hirokazu Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1517 days.

(21) Appl. No.: 11/065,272

(22) Filed: Feb. 25, 2005

(65) Prior Publication Data

US 2005/0246061 A1 Nov. 3, 2005

(30) Foreign Application Priority Data

Feb. 27, 2004 (JP) ............... 2004-053306

(51) Int. Cl.
*G06F 19/00* (2006.01)
(52) U.S. Cl. .................. 700/157; 700/87; 901/3; 901/9; 901/20; 901/36; 901/46
(58) Field of Classification Search ............... 700/157, 700/87, 259; 33/1 PT, 503, 502; 395/82, 395/80; 901/3, 9, 5, 15, 20, 36, 46; 254/268, 254/269
See application file for complete search history.

(56) References Cited

U.S. PATENT DOCUMENTS 4,989,161 A * 1/1991 Oaki ..................... 700/261

| 5,180,956 A | | 1/1993 | Oaki et al. |
| 5,438,647 A | * | 8/1995 | Nagamatsu et al. ......... 700/247 |
| 6,216,056 B1 | * | 4/2001 | Ito et al. ..................... 700/157 |
| 6,418,629 B1 | * | 7/2002 | Oh ............................. 33/1 PT |

FOREIGN PATENT DOCUMENTS

JP 62-237505 10/1987

(Continued)

OTHER PUBLICATIONS

T. Mita, et al., "Introduction to Robot Control", Corona Publishing Co. Ltd., 1989, pp. 238-239.

(Continued)

*Primary Examiner*—Khoi Tran
*Assistant Examiner*—Ronnie Mancho
(74) *Attorney, Agent, or Firm*—Oblon, Spivak, McClelland, Maier & Neustadt, L.L.P.

(57) ABSTRACT

A robot controller according to an embodiment of the present invention comprises a base; a first link; a first actuator which drives to rotate the first link relative to the base; a first torque transmission mechanism which transmits the torque of the first actuator to the first link at a speed reducing ratio of $N_1$; a first angular sensor which detects a rotating angle $\theta_{M1}$ of the first actuator; a first angular velocity sensor which detects an angular velocity $\omega_{A1}$ of the first link rotating relatively to the base; and a processor which calculates an angle of the first link relatively to the base by using a high frequency content of an integrated value of $\omega_{A1}$ and a low frequency content of $\theta_{M1} * N_1$, the high frequency content being equal to a first frequency or higher and the low frequency content being equal to a first frequency or lower.

10 Claims, 4 Drawing Sheets

FOREIGN PATENT DOCUMENTS

| | | |
|---|---|---|
| JP | 63-251808 | 10/1988 |
| JP | 8-110225 | 4/1996 |
| JP | 2772064 | 4/1998 |
| JP | 3322892 | 6/2002 |
| JP | 2004-53530 | 2/2004 |

OTHER PUBLICATIONS

Naoyuki Takesue, et al., "A Consideration on Inertia-Ratio and Vibration Control of Two-Inertia System—Effectiveness of Vibration Suppression of Driving Ripple—", IEEJ Trans. IA, vol. 123, No. 2, 2003, pp. 149-155.

* cited by examiner

ROBOT CONTROLLER AND ROBOT CONTROLLING METHOD

CROSS-REFERENCE TO RELATED APPLICATION

This application is based upon and claims the benefit of priority from the prior Japanese Patent Applications No. 2004-53306, filed on Feb. 27, 2004, the entire contents of which are incorporated herein by reference.

BACKGROUND OF THE INVENTION

1. Field of the Invention

The present invention relates to a robot controller and a robot controlling method.

2. Background Art

A multi-axis robot having a multi-link structure comprises a position feedback control system including an actuator (for example, an electric motor), which drives each axis, and an angular sensor (for example, a rotary encoder), which detects a rotation angle of each actuator. Many of position feedback control systems have used PID (proportional, integral and differential) control. Moreover, a semiclosed loop control, which controls the rotation angle of each link to indirectly control the angle of an actuator, has been used so far.

However, a torque transmission mechanism, which transmits torque of an actuator to a link, is not generally a rigid body, and is approximated by a reduction gear with a certain spring characteristic. Thereby, the multi-axis robot having a multi-link structure has caused a problem that the actuator and the link are vibrated each other, because the actuator and the link mechanically have a resonance characteristic.

In order to solve the above problem, there has been disclosed a state feedback control system for vibration control (refer to Japanese Patent Application Laid-open No. 63-251808), in which an angular sensor and an acceleration sensor are provided on a link for direct measurement of an angle and acceleration of the link.

However, in order to mount the angular sensor, a complex structure is required, for example, a projecting portion is required to be provided outside the axis of the link. Accordingly, the shape of the link is limited. Moreover, it is impossible to add the angular sensor to an existing multi-axis robot.

On the other hand, the acceleration sensor can be added on each link of the existing multi-axis robot (refer to "Introduction to Robot Control" published by CORONA PUBLISHING CO., LTD., pp. 238-239, 1989 (hereinafter, called Non-Patent Document 1)). However, it is general that the signal of the acceleration sensor has a small signal-to-noise (S/N) ratio, and is susceptible to gravity.

Furthermore, an advantage caused by feedback of the acceleration of the link is only change in the moment of inertia (refer to Institute of Electrical Engineers of Japan (IEEJ), Transactions on Industry Applications, Vol. 123, No. 2, pp. 149-155, 2003). Accordingly, in order to control the vibration of the link, feedback of the angular velocity and the angle of the link, in addition to that of the acceleration of the link, is indispensable. However, as the acceleration sensor, which can be obtained at a low price, can usually measure only a translational component, complex operations for coordinate transformation are required in order to obtain the angular acceleration of a link alone. For example, an operation, which has been disclosed as a formula A19b in the Non-Patent Document 1, is required, and, in this case, the angular velocity of a first link is separately required to be obtained in order to obtain the angular acceleration of a second link alone.

Moreover, the angular acceleration is required to be integrated once to obtain the angular velocity of the links from the angular acceleration thereof, and the angular acceleration is required to be integrated twice to obtain the angle of the links from the angular acceleration thereof. As the angle, which is obtained after the angular acceleration is integrated twice, is susceptible to a drift, it is impossible to obtain an exact link angle.

SUMMARY OF THE INVENTION

In order to solve the above-described problems, an object of an aspect of the present invention is to provide a robot controller and a robot controlling method, by which the operation of a link is accurately controlled with no need to perform complex operations for coordinate transformation.

A robot controller according to an embodiment of the present invention comprises a base; a first link; a first actuator which drives to rotate the first link relative to the base; a first torque transmission mechanism which transmits the torque of the first actuator to the first link at a speed reducing ratio of $N_1$; a first angular sensor which detects a rotating angle $\theta_{M1}$ of the first actuator; a first angular velocity sensor which detects an angular velocity $\omega_{A1}$ of the first link rotating relative to the base; and a processor which calculates an angle of the first link relative to the base by using a high frequency content of an integrated value of $\omega_{A1}$ and a low frequency content of $\theta_{M1}*N_1$, the high frequency content being equal to or higher than a first frequency and the low frequency content being equal to or lower than a first frequency.

A robot controlling method according to an embodiment of the present invention, which controls a robot comprising a first link; a first actuator which drives to rotate the first link relative to the base; a first torque transmission mechanism which transmits the torque of the first actuator to the first link at a speed reducing ratio of $N_1$; a first angular sensor provided on the first actuator; a first angular velocity sensor provided on the first link; and a processor calculating detected results of the first angular sensor and the first angular velocity sensor, the robot controlling method comprises driving the first link by the first actuator; detecting the rotating angle $\theta_{M1}$ of the first actuator by the first angular sensor; detecting the angular velocity $\omega_{A1}$ of the first link, which rotates relative to the base, by the first angular velocity sensor; and calculating an angle of the first link to the base, using a high frequency content, which is a first frequency or higher of an integrated value of $\omega_{A1}$ and a low frequency content, which is a first frequency or lower of $\theta_{M1}*N_1$, by the operating unit.

A robot controlling method according to another embodiment of the present invention, which controls a robot comprising a first link; a first actuator which drives to rotate the first link relative to the base; a first torque transmission mechanism which transmits the torque of the first actuator to the first link at a speed reducing ratio of $N_1$; a first angular sensor provided on the first actuator; a first angular velocity sensor provided on the first link; and a processor calculating detected results of the first angular sensor and the first angular velocity sensor, the robot controlling method comprises disposing the first angular velocity sensor on the first link; driving the first link by the first actuator; detecting the rotating angle $\theta_{M1}$ of the first actuator by the first angular sensor; detecting the angular velocity $\omega_{A1}$ of the first link, which rotates relative to the base, by the first angular velocity sensor; calculating an angle of the first link to the base, using a high frequency content, which is a first frequency or higher of an integrated value of $\omega_{a1}$ and a low frequency content, which is a first frequency or lower of $\theta_{M1}*N_1$, by the operating unit; tuning a motion control of the robot on the basis of the angle of the first link calculated by the processor; and eliminating the first angular velocity sensor from the first link after the tuning.

DETAILED DESCRIPTION OF THE INVENTION

Hereinafter, embodiments according to the present invention will be explained, referring to drawings. The present invention is not limited by the following embodiments.

In the following embodiments, the links of a multi-axis robot provided with a multi-link structure comprises an angular velocity sensor such as a rate giro. Thereby, the movement of the robot is accurately controlled with no need to perform complex operations.

First Embodiment

Figure 1:
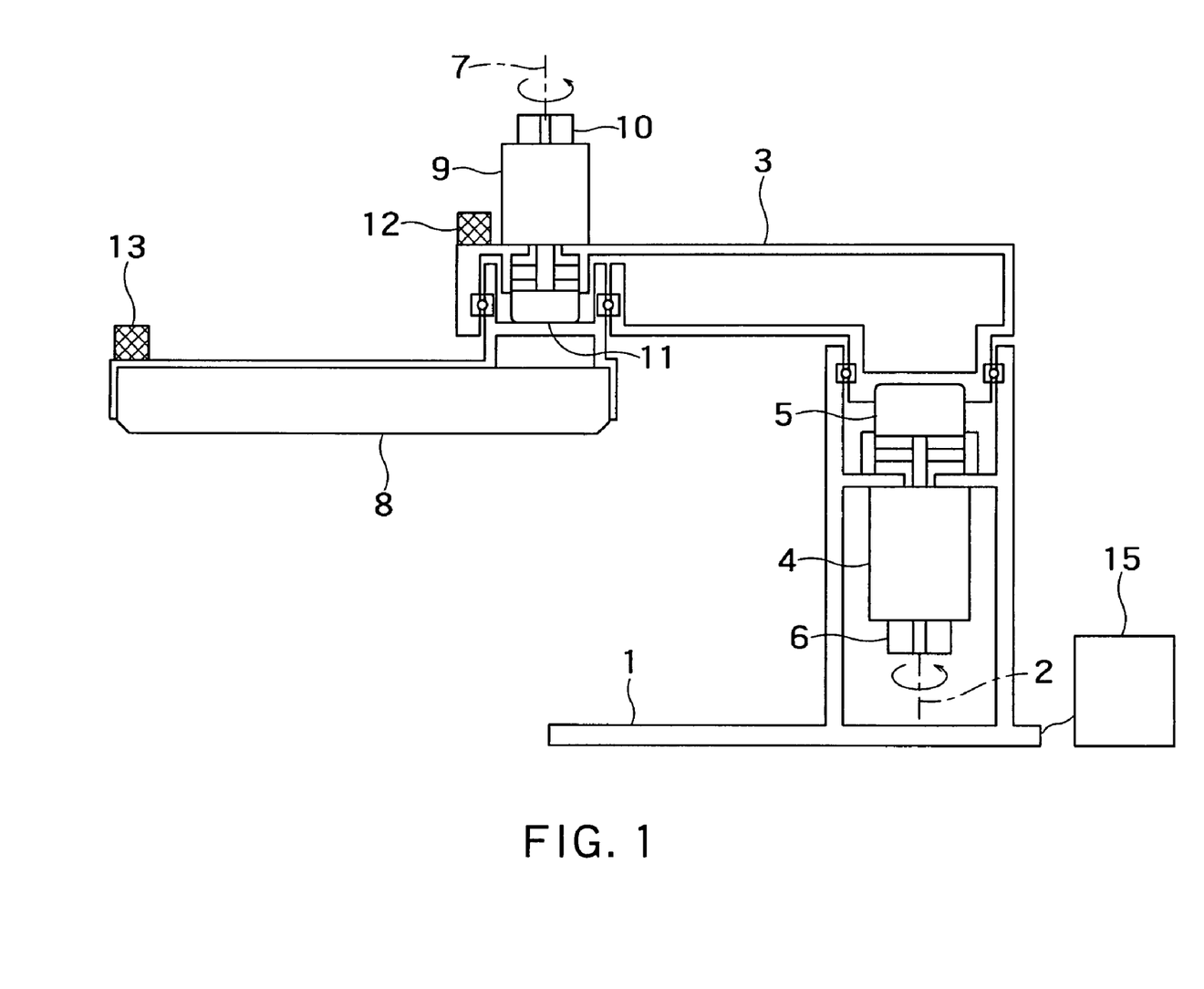
FIG. 1 is a sectional view of a robot 100 according to a first embodiment of the present invention.

FIG. 1 is a sectional view of a two-axis robot 100 (hereafter, called a robot 100) according to a first embodiment of the present invention. The robot 100 comprises: a base 1; links 3 and 8; motors 4 and 9; reduction gears (torque transmission mechanisms) 5 and 11; angle sensors 6 and 10; and angular velocity sensors 12 and 13.

One end of the link 3 is attached to the upper portion of the base 1, and the other end thereof is attached to the link 8. The link 3 can rotate around an axis 2 as a relative movement to the base 1, and the link 8 can rotate around an axis 7 as a relative movement to the link 3.

The motor 4 drives the link 3 through the reduction gear 5, and the motor 9 drives the link 8 through the reduction gear 11. The speed reducing ratio of the reduction gear 5 is assumed to be $N_1$ and that of the reduction gear 11 is assumed to be $N_2$. The angle sensor 6 is provided on the top of the motor 4, and measures a motor rotating angle $\theta_{M1}$ around the axis 2. The angle sensor 10 is provided on the top of the motor 9, and measures a motor rotating angle $\theta_{M2}$ around the axis 7.

The angular velocity sensor 12 is provided on the link 3, and the angular velocity sensor 13 is provided on the link 8. The angular velocity sensor 12 detects an angular velocity $\omega_{A1}$ of the link 3 to the base 1, and the angular velocity sensor 13 detects an angular velocity $\omega_{A2}$ of the link 8 to the link 3. The angular velocity sensors 12 and 13 may be, for example, a rate giro used for stabilization of the midair attitude of a missile object, and for guidance and control of a mobile unit. In the present embodiment, the angular velocity sensor 12 is arranged on the tip of the link 3, and the angular velocity sensor 13 is arranged on the tip of the link 8. However, as the angular velocity of the link 3 is constant on the link 3 and the angular velocity of the link 8 is constant on the link 8, the angular velocity sensor 12 may be arranged at an arbitrary position of the link 3, and the angular velocity sensor 13 may be arranged at an arbitrary position of the link 8. Moreover, the angular velocity $\omega_{A1}$ is an angular velocity component on the surface of revolution of the link 3, and the angular velocity $\omega_{A2}$ is an angular velocity component on the surface of revolution of the link 8.

Figure 2:
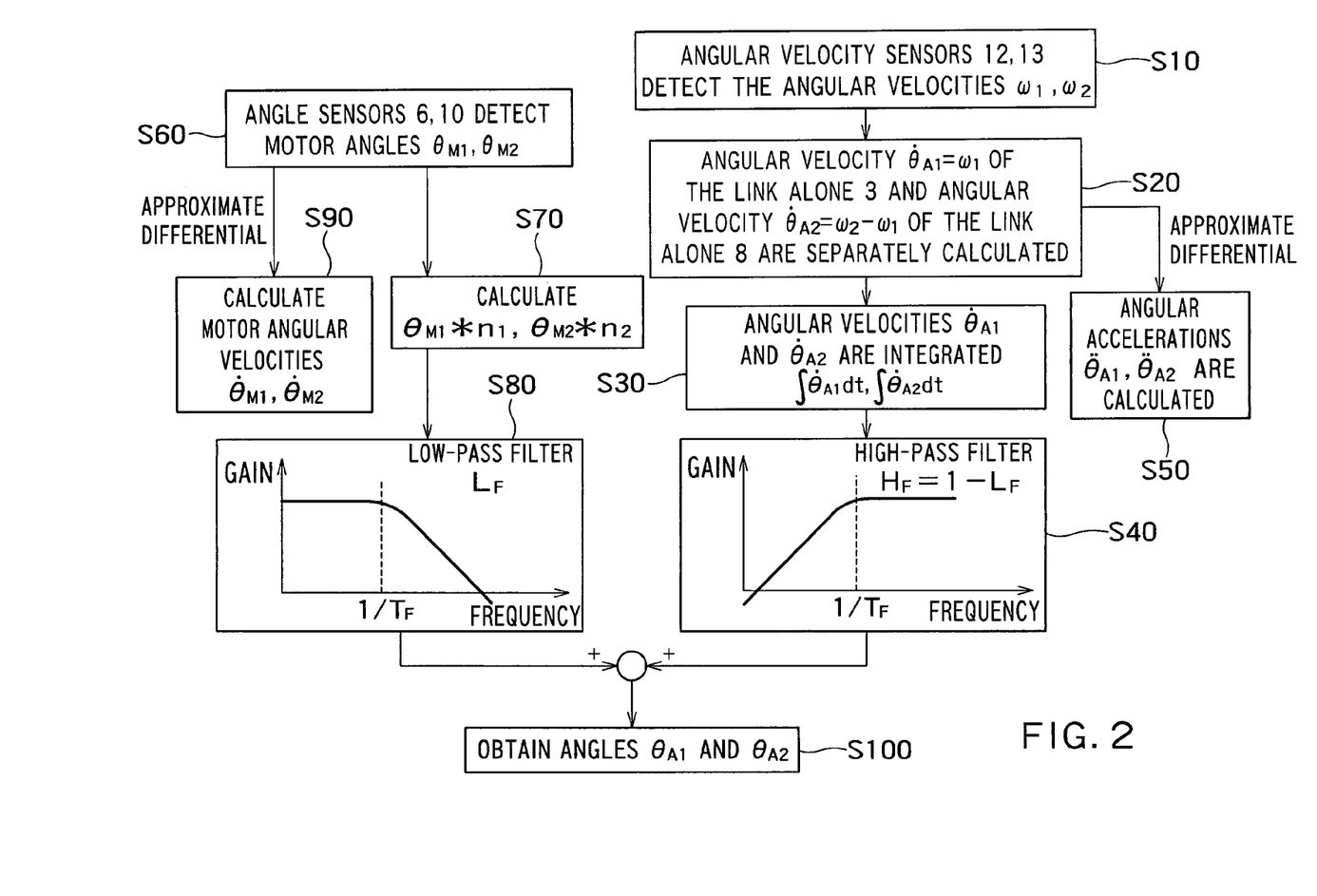
FIG. 2 is a flow chart showing a process, in which an angle $\theta_{A1}$ and an angle $\theta_{A2}$ are calculated.

FIG. 2 is a flow chart showing a process, in which an angle $\theta_{A1}$ of the link 3 and an angle $\theta_{A2}$ of the link 8 are calculated. Operation processing other than that at steps S10 and S60 may be executed by a CPU 15 arranged at an arbitrary position in the robot 100, or, by a CPU 15 provided outside the robot 100.

In the first place, the angular velocity sensor 12 detects the angular velocity $\omega_1$ and the angular velocity sensor 13 detects the angular velocity $\omega_2$ (S10). Then, the angular velocity $\dot{\theta}_{A1}$ of the link 3, and the angular velocity $\dot{\theta}_{A2}$ of the link 8 are separately calculated. As the angular velocity $\omega_1$ is the angular velocity of the link 3 to the base 1, and the angular velocity $\omega_2$ is the angular velocity of the link 8 thereto, the angular velocities $\dot{\theta}_{A1}$ and $\dot{\theta}_{A2}$ can be represented by the following Formula 1:

$$\dot{\theta}_{A1}=\omega_{A1}=\omega_1, \dot{\theta}_{A2}=\omega_{A2}=\omega_2-\omega_1 \quad \text{(Formula 1)}$$

Then, the angular velocities $\dot{\theta}_{A1}$ and $\dot{\theta}_{A2}$ are integrated (S30). Moreover, these integrated results pass through a high-pass filter $F_H$ (S40). Thereby, the high frequency content, which is a cutting off frequency $1/T_F$ or higher, of the angles $\theta_{A1}$ and $\theta_{A2}$ is obtained. Here, the reason for removal of the low frequency content of the angles $\theta_{A1}$ and $\theta_{A2}$ is that the effect of a drift should be removed because the link angles $\theta_{A1}$ and $\theta_{A2}$ cannot be accurately obtained due to the above effect of the drift, which is caused when the angular velocity $\dot{\theta}_{A1}$ of the link 3 and the angular velocity $\dot{\theta}_{A2}$ of the link 8 are integrated.

On the other hand, the following Formula 2 holds true because the reduction gears 5 and 11 are hardly twisted when the robot 100 is stopped, or operated in an extremely low frequency band (the left portion in FIG. 4):

$$\theta_{A1}=n_{H1}\theta_{M1}, \theta_{A2}=n_{H2}\theta_{M2} \quad \text{(Formula 2)}$$

Then, the angle sensor 6 detects a motor angle $\theta_{M1}$, and the angle sensor 10 detects a motor angle $\theta_{M2}$ (S60). Subsequently, the motor angle $\theta_{M1}$ is multiplied by the speed reducing ratio n1 (n1<1) to calculate $\theta_{m1}*n_1$, and the motor angle $\theta_{M2}$ is multiplied by the speed reducing ratio n2 (n2 <1) to calculate $\theta_{M2}*N2$ (S70). Then, $\theta_{M1}*n1$ and $\theta_{M2}*n2$ pass through a low-pass filter $F_L$ (S80). Thereby, the low frequency contents, which are a cutting off frequency $1/T_F$ or lower, of the angles $\theta_{A1}$ and $\theta_{A2}$ are obtained. Here, the reason for removal of the high frequency content of the angles $\theta_{A1}$ and $\theta_{A2}$ is that Formula 2 does not hold true because the reduction gears 5 and 11 are twisted in the case of the high frequency content.

When it is assumed that the filter coefficient of the high-pass filter $F_H$ is $H_F$, and the filter coefficient of the low-pass filter $F_L$ is $L_F$, a relation of $H_F=1-L_F$ is obtained. For example, the filter coefficients $H_F$ and $L_F$ can be represented as shown in the following Formula 3:

$$L_F = \frac{1}{1+T_F s}, \quad H_F = \frac{T_F s}{1+T_F s} \quad \text{(Formula 3)}$$

Here, $1/T_F$ represents a cutting off angular frequency of each filter. The accuracy of an extremely low frequency filter is decreases when $T_F$ is too large, and twisting by mechanical resonance is caused when $T_F$ is too small. Therefore, for example, $T_F$ is approximately from one to 10 inclusive.

Thus, the high frequency content of the angles $\theta_{A1}$ and $\theta_{A2}$, which have been obtained through steps S10 through S40, and the low frequency content of the angles $\theta_{A1}$ and $\theta_{A2}$, which have been obtained through steps S60 through S80, can be added by using the high-pass filter $F_H$ and the low-pass filter $F_L$, both of which have the relation of $H_F=1-L_F$ (S100). The angle $\theta_{A1}$ of the link 3 to the base 1 and the angle $\theta_{A2}$ of the link 8 to the link 3 can be calculated by the above operation.

Furthermore, the angular acceleration $\ddot{\theta}_{A1}$ of the link 3 can be calculated by a configuration, in which approximate differential of the angular velocity $\dot{\theta}_{A1}$ that has been obtained at step S20 is operated once, and the angular acceleration $\ddot{\theta}_{A2}$ of the link 8 can be calculated by a configuration, in which approximate differential of the angular velocity $\dot{\theta}_{A2}$ that has been obtained at step S20 is operated once (S50). Moreover, the motor angular velocity $\dot{\theta}_{M1}$ of the motor 6 can be calculated by a configuration, in which approximate differential of the motor angle $\theta_{M1}$ that has been obtained at step S60 is operated once, and the motor angular velocity $\dot{\theta}_{M2}$ of the motor 10 can be calculated by a configuration, in which approximate differential of the motor angle $\theta_{M2}$ that has been obtained at step S60 is operated once (S90).

According to the present embodiment using the above-described method, the state variables of the two-axis robot 100 can be obtained by the following Formula 4:

$$\begin{cases} \text{the motor angles } \theta_{M1}, \theta_{M2} \\ \text{the motor angular velocities } \dot{\theta}_{M1}, \dot{\theta}_{M2} \\ \text{the link angles } \theta_{A1}, \theta_{A2} \\ \text{the link angular velocities } \dot{\theta}_{A1}, \dot{\theta}_{A2} \\ \text{the link angular accelerations } \ddot{\theta}_{A1}, \ddot{\theta}_{A2} \end{cases} \quad \text{(Formula 4)}$$

According to the present embodiment, a state observer, which estimates state variables such as the motor angle, the link angle, and the link angular velocity, is not required to be configured. Accordingly, state feedback control can be realized in a robuster and more accurate manner than that of a conventional one.

According to the present embodiment, complex operations for coordinate transformation like conventional ones are not required, and the angular velocity $\dot{\theta}_{A1}$ of the link 3, and the angular velocity $\dot{\theta}_{A2}$ of the link 8 can be separately obtained by simple operations for coordinate transformation as shown in Formula 1.

According to the present embodiment, the motor angles $\theta_{M1}$ and $\theta_{M2}$, the motor angular velocities $\dot{\theta}_{M1}$ and $\dot{\theta}_{M2}$, the link angles $\theta_{A1}$ and $\theta_{A2}$, the link angular velocities $\dot{\theta}_{A1}$ and $\dot{\theta}_{A2}$, and the link angular accelerations $\ddot{\theta}_{A1}$ and $\ddot{\theta}_{A2}$, which are represented in Formula 4, can be obtained by a configuration, in which integral is operated once, or another configuration, in which differential is operated once. That is, as the present embodiment does not require in a different manner from a conventional one, a configuration, in which integral is operated twice, or another configuration, in which differential is operated twice, the state variables represented in Formula 4 are more accurate than conventional ones.

Second Embodiment

In a second embodiment, a state feedback control is performed, further considering compensation for interference force between links 3 and 8 in the first embodiment. The present embodiment has a similar configuration to that of the first embodiment, and the difference is that a CPU in the second embodiment performs operations, by which the interference force is compensated. A robot 100 can be represented by the following Formula 5, considering the joint elasticity:

$$M_M \ddot{\theta}_M + D_M \dot{\theta}_M + f_M \, sgn(\dot{\theta}_M) = \quad \text{(Formula 5)}$$
$$\tau - N_H[K_H(N_H \theta_M - \theta_A) + D_H(N_H \dot{\theta}_M - \dot{\theta}_A)]$$
$$M_A(\theta_A)\ddot{\theta}_A + c_A(\dot{\theta}_A, \theta_A) + D_A \dot{\theta}_A =$$
$$K_H(N_H \theta_M - \theta_A) + D_H(N_H \dot{\theta}_M - \dot{\theta}_A)$$

Here, $\theta_M=(\theta_{M1}, \theta_{M2})^T$ represents an motor angle; $\theta_A=(\theta_{A1}, \theta_{A2})^T$ does a link angle; $M_A(\theta_A) \in R^{2\times 2}$ does a link inertia matrix; $C_A(\dot{\theta}_A, \theta_A) \in R^{2\times 1}$ does a vector of Coriolis centrifugal force; $M_M=\text{diag}(m_{M1}, m_{M2})$ does an addition of inertia of a motor rotor and that of the high-speed stage of a reduction gear; $m_{M1}$ does an addition of inertia of a motor 6 and that of the high-speed stage of the reduction gear; $m_{M2}$ does an addition of inertia of a motor 10 and that of the high-speed stage of the reduction gear; $D_M=\text{diag}(d_{M1}, d_{M2})$ does a coefficient of viscous friction for a motor; $D_A=\text{diag}(d_{A1}, d_{A2})$ does a coefficient of viscous friction for a link; $d_{M1}$ does a coefficient of viscous friction for the motor 6; $d_{M2}$ does a coefficient of viscous friction for the motor 10; $d_{A1}$ does a coefficient of viscous friction for the link 3; $d_{A2}$ does a coefficient of viscous friction for a link 8; $K_H=\text{diag}(k_{H1}, k_{H2})$ does a spring constant; $D_H=\text{diag}(d_{H1}, d_{H2})$ does a damping coefficient; $N_H=\text{diag}(n_{H1}, n_{H2})$ does a speed reducing ratio $(n_{H1}, n_{H2} \leq 1)$; $f_M=(f_{M1}, f_{M2})^T$ does a Coulomb's kinetic friction; $f_{m1}$ does a Coulomb's kinetic friction of the motor 6; $f_{M2}$ does a Coulomb's kinetic friction of the motor 10; $\tau=[\tau_1, \tau_2]^T$ does an motor torque reference; $\tau_1$ does a motor torque reference of the motor 6; and $\tau_2$ does a motor torque reference of the motor 10.

Assuming that $\alpha$, $\beta$, and $\gamma$ are a base parameter, the link inertia matrix can be represented by the following Formula 6:

$$M_A(\theta_A) = \begin{bmatrix} \alpha + \beta + 2\gamma \cos(\theta_{A2}) & \beta + \gamma \cos(\theta_{A2}) \\ \beta + \gamma \cos(\theta_{A2}) & \beta \end{bmatrix} \quad \text{(Formula 6)}$$

Moreover, the vector of Coriolis centrifugal force can be represented by the following Formula 7:

$$c_A(\dot{\theta}_A, \theta_A) = \begin{bmatrix} -\gamma(2\dot{\theta}_{A1}\dot{\theta}_{A2} + \dot{\theta}_{A2}^2)\sin(\theta_{A2}) \\ \gamma \dot{\theta}_{A1}^2 \sin(\theta_{A2}) \end{bmatrix} \quad \text{(Formula 7)}$$

Then, assuming that the joints of the links 3 and 8 in the robot 100 are a rigid body in a low frequency band separated from a resonance frequency for the mechanism, $\theta_M=N_H \times \theta_A$ holds true. When the $\theta_M=N_H \times \theta_A$ is substituted into Formula 5, the following Formula 8 is derived. Here, the low frequency band separated from the resonance frequency for the mechanism with regard to the joints of the links 3 and 8 means frequency domains of 5 rad/s or less in frequency response characteristics shown in FIG. 4.

$$M(\theta_A)\ddot{\theta}_A + c_A(\dot{\theta}_A, \theta_A) + D\dot{\theta}_A + f_M sgn(\dot{\theta}_M)/N_H = \tau/N_H \quad \text{(Formula 8)}$$

Here, $M(\theta_A)$ can be represented as a rigid-body model by an inertia matrix like the following Formula 9, and D can be represented as a rigid-body model by a matrix of the viscous friction coefficients like the following Formula 10:

$$M(\theta_A) = \begin{bmatrix} \alpha + \beta + 2\gamma \cos(\theta_{A2}) + m_{M1}/n_{H1}^2 & \beta + \gamma \cos(\theta_{A2}) \\ \beta + \gamma \cos(\theta_{A2}) & \beta + m_{M2}/n_{H2}^2 \end{bmatrix} \quad \text{(Formula 9)}$$

$$D = diag(d_{A1} + d_{M1}/n_{H1}^2, d_{A2} + d_{M2}/n_{H2}^2) \quad \text{(Formula 10)}$$

Parameters used for $M(\theta_A)$, $f_M$, and the like in Formula 8 can be identified by a method of least squares, which uses testing operation data based on random motor inputs (torque reference $\tau$) into a two-axis robot. The above testing operation data means the following state variables, which are shown in Formula 4, and are measured or calculated in the first embodiment: $\dot\theta_{M1}$; $\dot\theta_{M2}$; $\theta_{A1}$; $\theta_{A2}$; $\dot\theta_{A1}$; $\dot\theta_{A2}$; $\ddot\theta_{A1}$; and $\ddot\theta_{A2}$. When the parameters $\beta$, $\gamma$, $f_M$, which are identified as described above, are used, nonlinear compensation and decoupling control for a two-axis robot model represented by Formula 5 can be realized at the same time.

When, for example, a new reference torque u is defined to be $(u_1, u_2)^T$, the following Formula 11 and Formula 12 hold true:

$$\tau = M_N(\theta_A)\ddot\theta_A + c_A(\dot\theta_A, \theta_A) + f_M sgn(\dot\theta_M) + u \quad \text{(Formula 11)}$$

$$M_N(\theta_A) = \begin{bmatrix} 2\gamma(\cos(\theta_{A2}) - 1) & \beta + \gamma \cos(\theta_{A2}) \\ \beta + \gamma \cos(\theta_{A2}) & 0 \end{bmatrix} \quad \text{(Formula 12)}$$

When Formula 11 and Formula 12 are substituted into Formula 5, the following Formula 13 and Formula 14 hold true:

$$M_M \ddot\theta_M + D_M \dot\theta_M = \quad \text{(Formula 13)}$$
$$u - N_H[K_H(N_H \theta_M - \theta_A) + D_H(N_H \dot\theta_M - \dot\theta_A)]$$

$$M_C \ddot\theta_A + D_A \dot\theta_A = K_H(N_H \theta_M - \theta_A) + D_H(N_H \dot\theta_M - \dot\theta_A)$$

$$M_C = \begin{bmatrix} \alpha + \beta + 2\gamma & 0 \\ 0 & \beta \end{bmatrix} \quad \text{(Formula 14)}$$

As Formula 13 and Formula 14 are linear with regard to the new reference torque u, and the matrices are diagonalized, decoupling control of the operation of an axis 2 and that of an axis 7 is realized. That is, operations for the links 3 and 8 are independently performed as a link without any interference.

Thereby, when a transfer function between the new reference torque u and the motor angular velocity $\dot\theta_M$ is defined to be $G_M(S)$, Formula 15 and Formula 16 can be obtained with regard to the transfer function $G_M(S)$:

$$G_M(s) = diag[G_{M1}(s), G_{M2}(s)] \quad \text{(Formula 15)}$$

$$G_{Mi} = \frac{b_{0i} + b_{1i}s + b_{2i}s^2}{a_{0i} + a_{1i}s + a_{2i}s^2 + a_{3i}s^3} \quad (i = 1, 2) \quad \text{(Formula 16)}$$

In Formula 16, links, which have become non-interactive by the above-described operations, can be independently identified by a parameter identifying method for one link.

Figure 3:
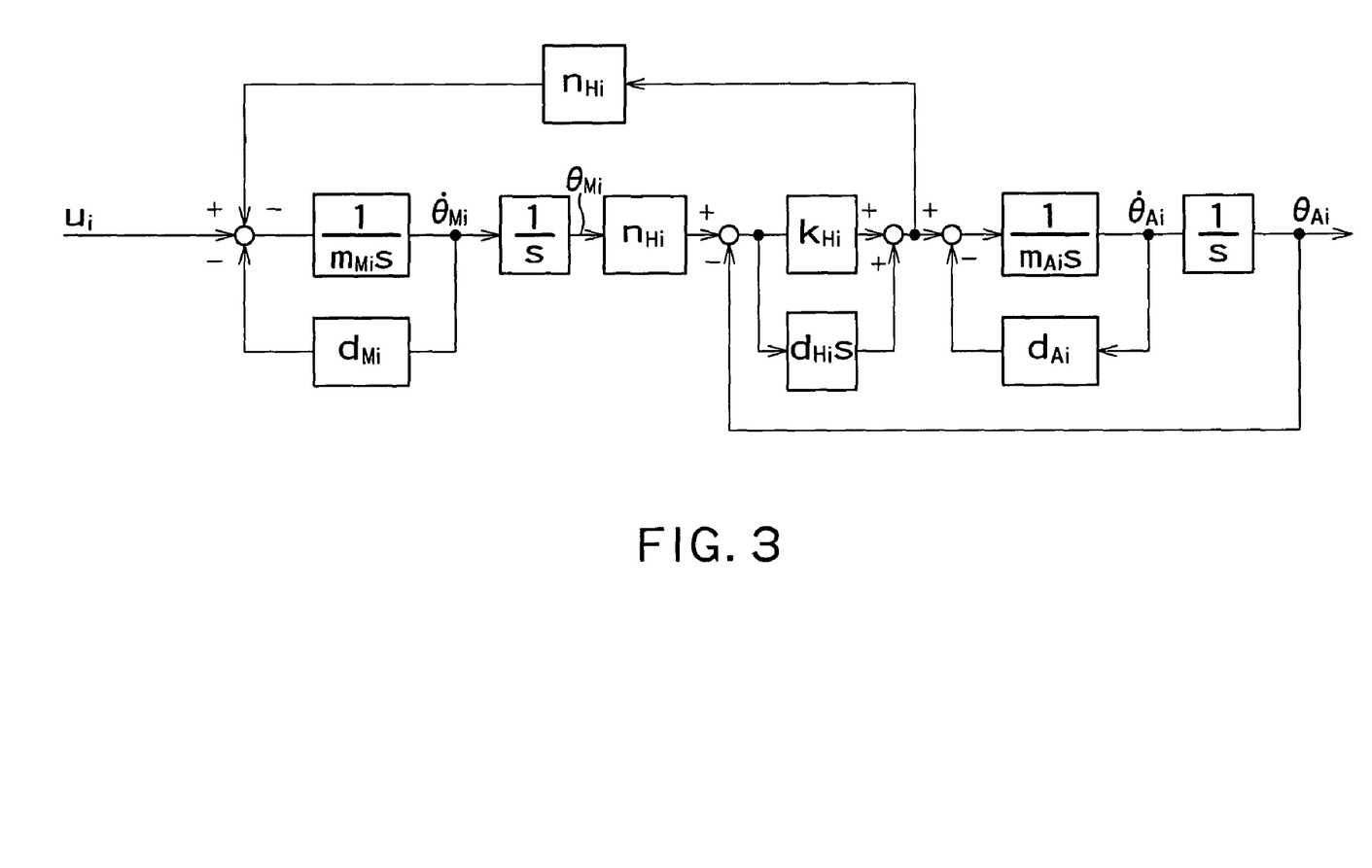
FIG. 3 is a block diagram, according to which the transfer function $G_M(S)$ is identified.
Figure 4:
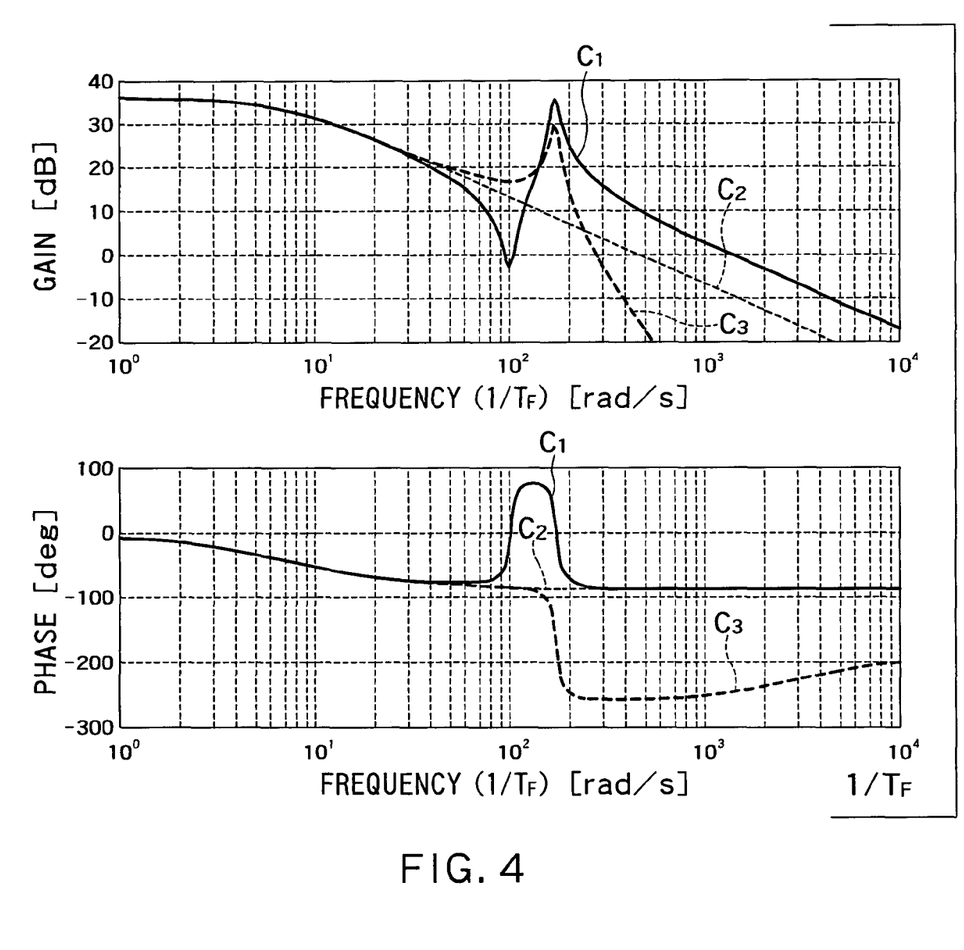
FIG. 4 is a graph showing identified frequency response characteristics.

All physical parameters necessary for describing Formula 5 can be identified by the above-described steps. Here, FIG. 3 is a block diagram, according to which the transfer function $G_M(S)$ for either axis 2 or axis 7 is identified, and FIG. 4 is a graph showing identified frequency response characteristics. Here, in FIG. 4, $C_1$ is a curve, which is obtained when $u_1$ is approached to $\dot\theta_{M1}$, and $u_2$ is approached to $\dot\theta_{M2}$; $C_2$ is a curve, which is obtained when $u_1$ is approached to $\dot\theta_{M1}$, $u_2$ is approached to $\dot\theta_{M2}$, and $k_{H1}$ and $k_{H2}$ are approached to infinity; and $C_3$ is a curve, which is obtained when $u_1$ is approached to $n_{H1}\cdot\dot\theta_{A1}$, and $u_2$ is approached to $n_{H2}\cdot\dot\theta_{A2}$.

As described above, the links 3 and 8 can be treated as one independent link. Accordingly, a linear equation of state for one axis is derived as the next step in order to calculate constants of state feedback control for vibration suppressing control. In the first place, the following Formula 17 is defined, and is changed to the following Formula 18:

$$\begin{cases} M_i \ddot\theta_i + D_i \dot\theta_i + K_i \theta_i = e_i u_i & (i = 1, 2) \\ \theta_i = [\theta_{Ai}, \theta_{Mi}]^T, \quad e_i = [0, 1]^T \\ M_i = diag[\alpha + \beta + \gamma, m_{Mi}] \\ D_i = \begin{bmatrix} d_{Ai} + d_{Hi} & -n_{Hi} d_{Hi} \\ -n_{Hi} d_{Hi} & d_{Mi} + n_{Hi}^2 d_{Hi} \end{bmatrix} \\ K_i = \begin{bmatrix} k_{Hi} & -n_{Hi} k_{Hi} \\ -n_{Hi} k_{Hi} & k_{Hi} n_{Hi}^2 \end{bmatrix} \end{cases} \quad \text{(Formula 17)}$$

$$\ddot\theta_i = M_i^{-1}(e_i u_i - D_i \dot\theta_i - K_i \theta_i) \quad \text{(Formula 18)}$$

Then, the following Formula 19 is obtained as an equation of state:

$$\dot x_i = A_i x_i + b_i u_i, \quad \text{(Formula 19)}$$

$$y_i = c_i x_i,$$

$$x_i = [\theta_{Ai} \; \theta_{Mi} \; \dot\theta_{Ai} \; \dot\theta_{Mi}]^T, (i = 1, 2)$$

$$A_i = \begin{bmatrix} 0 & I_2 \\ -M_i^{-1} K_i & -M_i^{-1} D_i \end{bmatrix},$$

$$b_i = \begin{bmatrix} 0 \\ M_i^{-1} e_i \end{bmatrix},$$

$$c_i = [0 \; 0 \; 0 \; 1],$$

$$I_2 = \begin{bmatrix} 1 & 0 \\ 0 & 1 \end{bmatrix}$$

As one specific example, all-state feedback control with integral control to make steady-state deviation 0 can be applied as shown in Formula 20:

$$u_i = \quad \text{(Formula 20)}$$
$$-k_i \int (\theta_{MRi} - \theta_{Mi}) dt - [f_{1i} \; f_{2i} \; f_{3i} \; f_{4i}] \begin{bmatrix} \theta_{Ai} \\ \theta_{Mi} \\ \dot\theta_{Ai} \\ \dot\theta_{Mi} \end{bmatrix}$$

$$(i = 1, 2)$$

Control constants $k_i$, $f_{1i}$, $f_{2i}$, $f_{3i}$, $f_{4i}$ in Formula 20 can be calculated by, for example, a Turn over design method effective for vibration control. However, a robust vibration suppressing control system can be obtained without use of the state observer according to the present embodiment.

According to the present embodiment, the nonlinear interference force of the links 3 and 8 is removed, and, at the same time, vibration caused by low rigidity of the axes 2 and 7 can be controlled by combination of state variables shown in Formula 4, and Formula 11, Formula 12, and Formula 20. Furthermore, the present embodiment has similar advantages to those of the first embodiment.

Third Embodiment

A third embodiment has a configuration, in which state feedback control is performed, considering a force from the outside (hereafter, called an external force), which is given to a link 3 or 8. The present embodiment has a similar configuration to that of the first embodiment, but the difference between the both embodiments is that feedback control is performed, considering the external force.

In the present embodiment, the link 8 is provided with an inner force sensor (not shown), by which a force applied on the tip of the link 8 is measured. The present embodiment can be applied to, for example, a case, in which a predetermined force is applied to a certain object by a robot 100. In this case, a joint is kept in a twisted state even when a link angular velocity $\dot{\theta}_A$ becomes 0, because a stationary force is applied to the tip of the link 8. Accordingly, Formula 2 does not hold true. Then, in the present embodiment, a twisted angle of the joint is corrected to estimate a correct link angle.

Assuming that a force vector measured with the inner force sensor attached at the tip of the link 8 is f, a joint torque vector $\tau$ can be represented by the following Formula 21:

$$\tau = J^T f \quad \text{(Formula 21)}$$

Here, $J^T$ is a transposed matrix of a Jacobian matrix (2 columns and 2 rows) like the following Formula 22:

$$J = \begin{bmatrix} -l_1\sin\theta_{A1} - l_2\sin(\theta_{A1}+\theta_{A2}) & -l_2\sin(\theta_{A1}+\theta_{A2}) \\ l_1\cos\theta_{A1} + l_2\cos(\theta_{A1}+\theta_{A2}) & l_2\cos(\theta_{A1}+\theta_{A2}) \end{bmatrix} \quad \text{(Formula 22)}$$

This Jacobian matrix is a function of the link angle $\theta_A$, which can not be measured in an ordinary manner. However, considering that the accuracy error of the inner force sensor and the twisted amount of the joint are very small, it presents no problem to obtain the Jacobian matrix with measurable motor angles $\theta_{M1}$, and $\theta_{M2}$. When the Jacobian matrix is obtained from the motor angles $\theta_{M1}$ and $\theta_{M2}$, the Jacobian matrix can be represented by the following Formula 23:

$$J = \begin{bmatrix} -l_1\sin(n_{H1}\theta_{M1}) - l_2\sin(n_{H1}\theta_{M1}+n_{H2}\theta_{M2}) & -l_2\sin(n_{H1}\theta_{M1}+n_{H2}\theta_{M2}) \\ l_1\cos n_{H1}\theta_{M1} + l_2\cos(n_{H1}\theta_{M1}+n_{H2}\theta_{M2}) & l_2\cos(n_{H1}\theta_{M1}+n_{H2}\theta_{M2}) \end{bmatrix} \quad \text{(Formula 23)}$$

Accordingly, the twisted angle ($\Delta$ theta) can be represented by Formula 24, using a spring constant $K_H$ (the diagonal matrix in Formula 5) of the joint, which has already been identified:

$$\Delta\theta = K_H^{-1}\tau \quad \text{(Formula 24)}$$

When the stationary force is applied to the tip of the link 8 and the link angular velocity $\dot{\theta}_A$ is 0, the link angle $\theta_A$ can be obtained as Formula 25:

$$\theta_A = N_H \theta_M - \Delta\theta \quad \text{(Formula 25)}$$

According to the present embodiment, the correct link angle can be estimated by correcting the twisted angle of the joint between the links even when the stationary force is applied to the tip of the link 8. Moreover, the present embodiment has similar advantages to those of the first and second embodiments by combination of the first and second embodiments.

Fourth Embodiment

A fourth embodiment has a configuration, in which the stationary force applied to the link 8 is gravity, wherein the stationary force has been described in the third embodiment. Though the links 3 and 8 of the robot 100 shown in FIG. 1 are rotated in a horizontal plane, the links 3 and 8 are influenced by gravity when the links 3 and 8 are configured to be rotated in a vertical plane. Thereby, the joints of the links 3 and 8 are in a twisted state even under a stationary state.

In this case, a gravity term $g_A(\theta_A)$ represented by the gravitational acceleration g is added to Formula 11. Thereby, torque $\tau$ can be represented by the following Formula 26, and the gravity term $g_A(\theta_A)$ can be represented by the following Formula 27:

$$\tau = M_N(\theta_A)\ddot{\theta}_A + c_A(\dot{\theta}_A, \theta_A) + f_M\,\text{sgn}(\dot{\theta}_M) + g_A(\theta_A) + u \quad \text{(Formula 26)}$$

$$g_A(\theta_A) = \begin{bmatrix} -r_1 g\sin\theta_{A1} - r_2 g\sin(\theta_{A1}+\theta_{A2}) \\ -r_2 g\sin(\theta_{A1}+\theta_{A2}) \end{bmatrix} \quad \text{(Formula 27)}$$

Subsequently, a parameter $r_1$ $r_2$ in $g_A(\theta_A)$ is identified. Here, it presents no problem to describe Formula 27 with measurable motor angles $\theta_{M1}$ and $\theta_{M2}$, based on a similar reason to that of Formula 23. Thereby, gravitational torque applied to the joints of the links 3 and 8 can be calculated. Moreover, a stationary twisted angle ($\Delta\theta$) can be corrected by application of Formula 21 through Formula 25.

According to the present embodiment, the correct link angle can be estimated by correcting the twisted angle of the joints between the links even when the stationary force is applied to the links. Moreover, the present embodiment has similar advantages to those of the first through third embodiments by combination of the first through third embodiments.

Though the two-axis robot 100 has been used in the first through fourth embodiments, even a multi-axis robot with three or more axes can be controlled in a similar manner.

In the first through fourth embodiments, the angular velocity sensor (for example, a rate giro) may be arranged on all the links at any time. However, in order to reduce the cost, or when there is a restriction in the attaching positions of the links, the angular velocity sensor may be selectively arranged only on a part of the links. For example, the angular velocity sensor may be arranged only on links, for which vibration suppressing control performance is regarded as of major importance (variant 1). Moreover, there may be applied another configuration (variant 2), in which an angular velocity sensor is installed only when a robot model is identified, and, after the robot model is identified, the angular velocity sensor is eliminated from a robot when the robot according to the robot model is manufactured or used. Furthermore, there may be applied further another configuration (variant 3), in which a state estimation observer for a robot is made compliant with the signal of an angular velocity sensor once the angular velocity sensor is arranged on a link, and, thereafter, the angular velocity sensor is removed from the link.

In order to realize the above variants 1 through 3, the angular velocity sensors 12 and 13 may be disposed on the links 3 and 8 in a detachable manner. The angular velocity sensors 12 and 13 are configured to be disposed on the links 3 and 8 with, for example, a screwing or fitting mechanism. Moreover, a connector for signal lines from the angular velocity sensor 12 is preferably provided on the link 3, and a connector for signal lines from the angular velocity sensor 13 is preferably provided on the link 8.

Here, the angular velocity sensor such as a rate giro has been used for stabilization of the midair attitude of a missile object, and for guidance and control of a mobile unit. A small, light, highly accurate, and cheap rate giro has been available on the market along with recent development of a micro electromechanical system (MEMS) technology.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot controller comprising:
   a base;
   a first link;
   a first actuator which drives to rotate the first link relative to the base;
   a first torque transmission mechanism which transmits the torque of the first actuator to the first link at a speed reducing ratio of $N_1$;
   a first angular sensor which detects a rotating angle $\theta_{M1}$ of the first actuator;
   a first angular velocity sensor which detects an angular velocity $\omega_{A1}$ of the first link rotating relative to the base; and
   a processor which calculates an angle of the first link relative to the base by using a high frequency content of an integrated value of $\omega_{A1}$ and a low frequency content of $\theta_{M1} * N_1$, the high frequency content being equal to or higher than a first frequency and the low frequency content being equal to or lower than the first frequency.

2. The robot controller according to claim 1 further comprising:
   a second link;
   a second actuator which drives to rotate the second link relative to the first link;
   a second torque transmission mechanism which transmits the torque of the second actuator to the second link at a speed reducing ratio of $N_2$;
   a second angular sensor which detects a rotating angle $\theta_{M2}$ of the second actuator; and
   a second angular velocity sensor which detects an angular velocity $\omega_{A2}$ of the second link rotating relative to the base;
   wherein the processor further calculates an angle of the second link relative to the first link by using a high frequency content of an integrated value of $\omega_{A2} - \omega_{A1}$ and a low frequency content of $\theta_{M2} * N_2$, the high frequency content being equal to or higher than the first frequency and the low frequency content being equal to or lower than the first frequency.

3. The robot controller according to claim 2, wherein
   the processor calculates a sum of the high frequency content of the integrated value of $\omega_{A1}$ and the low frequency content of $\theta_{M1}*N_1$ as the angle of the first link relative to the base, and calculates a sum of the high frequency content of the integrated value of $\omega_{A2} - \omega_{A1}$ and the low frequency content of $\theta_{M2}*N_2$ as the angle of the second link relative to the first link.

4. The robot controller according to claim 2, wherein
   the processor calculates an angular velocity of the first actuator by differentiating the rotating angle $\theta_{M1}$ and an angular velocity of the second actuator by differentiating the rotating angle $\theta_{M2}$, and calculates an angular acceleration of the first link by differentiating the angular velocity $\omega_{A1}$ and an angular acceleration of the second link by differentiating the angular velocity $\omega_{A2}$.

5. The robot controller according to claim 2 further comprising:
   a low-pass filter, through which the low frequency contents of $\theta_{M1}*N1$ and $\theta_{M2}*N2$ pass; and
   a high-pass filter, through which the high frequency contents of $\theta_{M1}*N1$ and $\theta_{M2} * N2$ pass,
   wherein a sum of the filter coefficient of the high-pass filter and the filter coefficient of the low-pass filter is substantially 1.

6. The robot controller according to claim 5, wherein
   a reciprocal number $T_F$ of a cutting off frequency of the low pass filter and the high pass filter is a value from 1 to 10.

7. The robot controller according to claim 1 further comprising:
   a low-pass filter, through which the low frequency contents of $\theta_{M1}*N1$ and $\theta_{M2}*N2$ pass; and
   a high-pass filter, through which the high frequency contents of $\theta_{M1}*N1$ and $\theta_{M2}* N2$ pass,
   wherein a sum of the filter coefficient of the high-pass filter and the filter coefficient of the low-pass filter is substantially 1.

8. The robot controller according to claim 7, wherein
   a reciprocal number $T_F$ of a cutting off frequency of the low pass filter and the high pass filter is a value from 1 to 10.

9. A robot controlling method, which controls a robot comprising a first link; a first actuator which drives to rotate the first link relative to the base; a first torque transmission mechanism which transmits the torque of the first actuator to the first link at a speed reducing ratio of $N_1$; a first angular sensor provided on the first actuator; a first angular velocity sensor provided on the first link; and a processor calculating detected results of the first angular sensor and the first angular velocity sensor,
   the robot controlling method comprising:
   driving the first link by the first actuator;
   detecting the rotating angle $\theta_{M1}$ of the first actuator by the first angular sensor;
   detecting the angular velocity $\omega_{A1}$ of the first link, which rotates relative to the base, by the first angular velocity sensor; and
   calculating an angle of the first link to the base, using a high frequency content, which is a first frequency or higher of an integrated value of $\omega_{A1}$ and a low frequency content, which is the first frequency or lower of $\theta_{M1}*N_1$, by the processor.

10. The robot controlling method according to claim 9, which controls a robot further comprising; a second link; a second actuator which drives to rotate the second link relative to the first link; a second torque transmission mechanism, which transmits the torque of the second actuator to the second link at a speed reducing ratio of $N_2$; a second angular sensor provided on the second actuator; and a second angular velocity sensor provided on the second link, wherein the processor calculates detected results of the second angular sensor and the second angular velocity sensor, the robot controlling method further comprising:

driving the second link by the second actuator;

detecting the rotating angle $\theta_{M2}$ of the second actuator by the second angular sensor;

detecting the angular velocity $\omega_{A2}$ of the second link rotating relatively to the base by the second angular velocity sensor; and calculating an angle of the second link to the first link, using a high frequency content, which is the first frequency or higher of an integrated value of $(\omega_{A2}-\omega_{A1}$ and a low frequency content, which is the first frequency or lower of $\theta_{M2}*N_2$, by the processor.

* * * * *